(12) United States Patent
Honda et al.

(10) Patent No.: US 7,557,858 B2
(45) Date of Patent: Jul. 7, 2009

(54) IMAGING PROCESSING DEVICE AND A METHOD OF PROCESSING AN IMAGE

(75) Inventors: Kanako F. Honda, Hyogo (JP); Nobukazu Shima, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 916 days.

(21) Appl. No.: 10/963,664

(22) Filed: Oct. 14, 2004

(65) Prior Publication Data

US 2005/0083432 A1  Apr. 21, 2005

(30) Foreign Application Priority Data

Oct. 15, 2003 (JP) ............................. 2003-355476
Sep. 3, 2004 (JP) ............................. 2004-257454

(51) Int. Cl.
*H04N 5/235* (2006.01)
*G03B 7/00* (2006.01)
*H04N 5/238* (2006.01)

(52) U.S. Cl. ........................... 348/362; 348/366

(58) Field of Classification Search .............. 348/241, 348/243, 246–248, 362–366; 382/168
See application file for complete search history.

(56) References Cited

U.S. PATENT DOCUMENTS

| 6,061,091 | A * | 5/2000 | Van de Poel et al. | 348/241 |
| 7,035,437 | B2 * | 4/2006 | Yamaguchi | 382/112 |
| 7,174,041 | B2 * | 2/2007 | Shima | 382/168 |
| 2001/0010553 | A1 * | 8/2001 | Tanaka et al. | 348/311 |
| 2002/0181759 | A1 * | 12/2002 | Yamaguchi | 382/149 |
| 2003/0103141 | A1 * | 6/2003 | Bechtel et al. | 348/148 |
| 2003/0202694 | A1 * | 10/2003 | Shima | 382/173 |

FOREIGN PATENT DOCUMENTS

JP  A 05-122600  5/1993

* cited by examiner

*Primary Examiner*—David L Ometz
*Assistant Examiner*—Kelly L Jerabek
(74) *Attorney, Agent, or Firm*—Oliff & Berridge, PLC

(57) ABSTRACT

An image processing device includes a camera that picks up an image, an image density recognizer that recognizes density of the image, and an exposure controller that in an exposure control period automatically controls an exposure of the camera based on the density recognized. The exposure controller period includes at least a maximum exposure period during which the exposure is set to a maximum exposure, a minimum exposure period during which the exposure is set to a minimum exposure, and a normal exposure period during which the exposure is set to in between the maximum exposure and the minimum exposure.

17 Claims, 11 Drawing Sheets

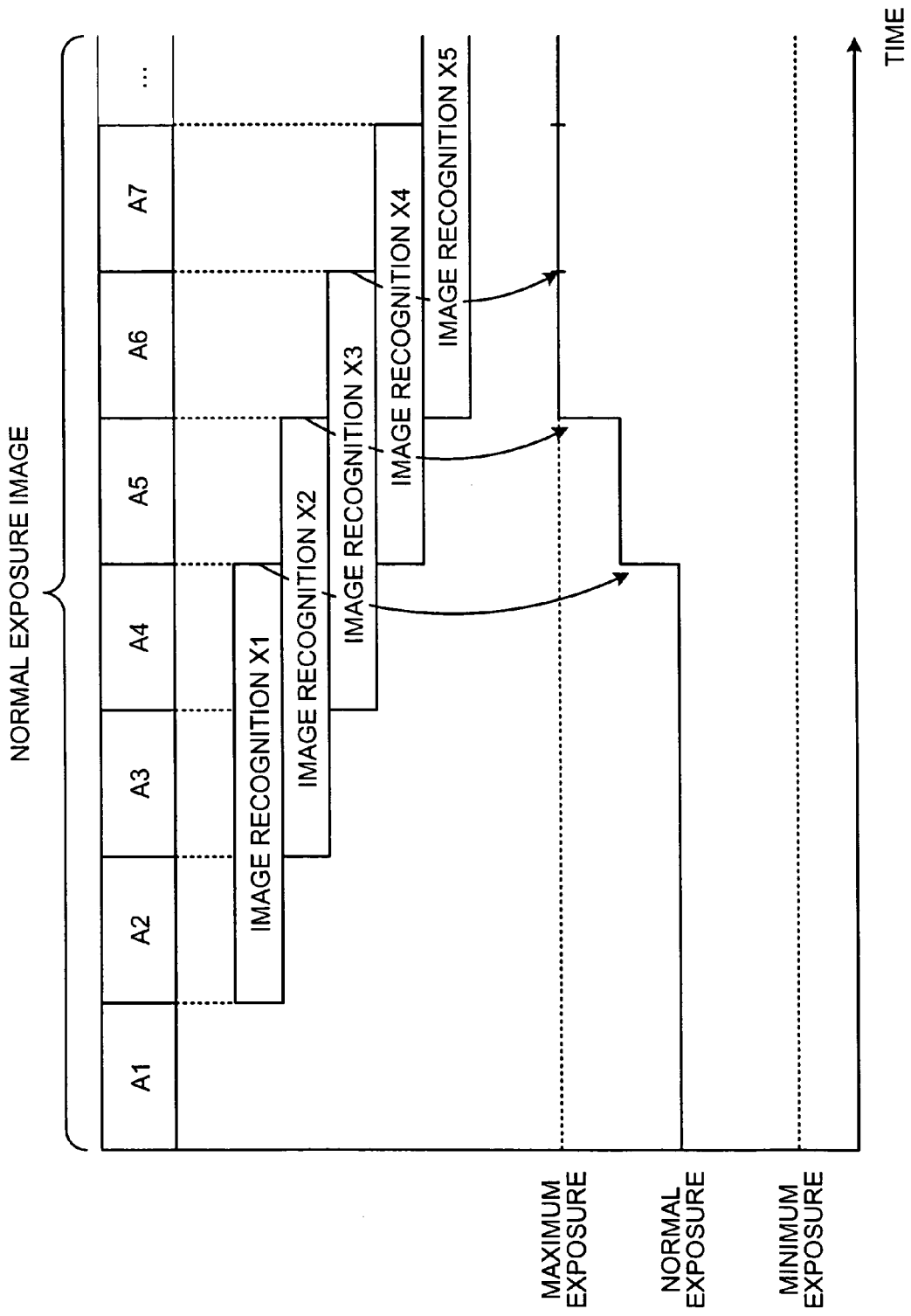

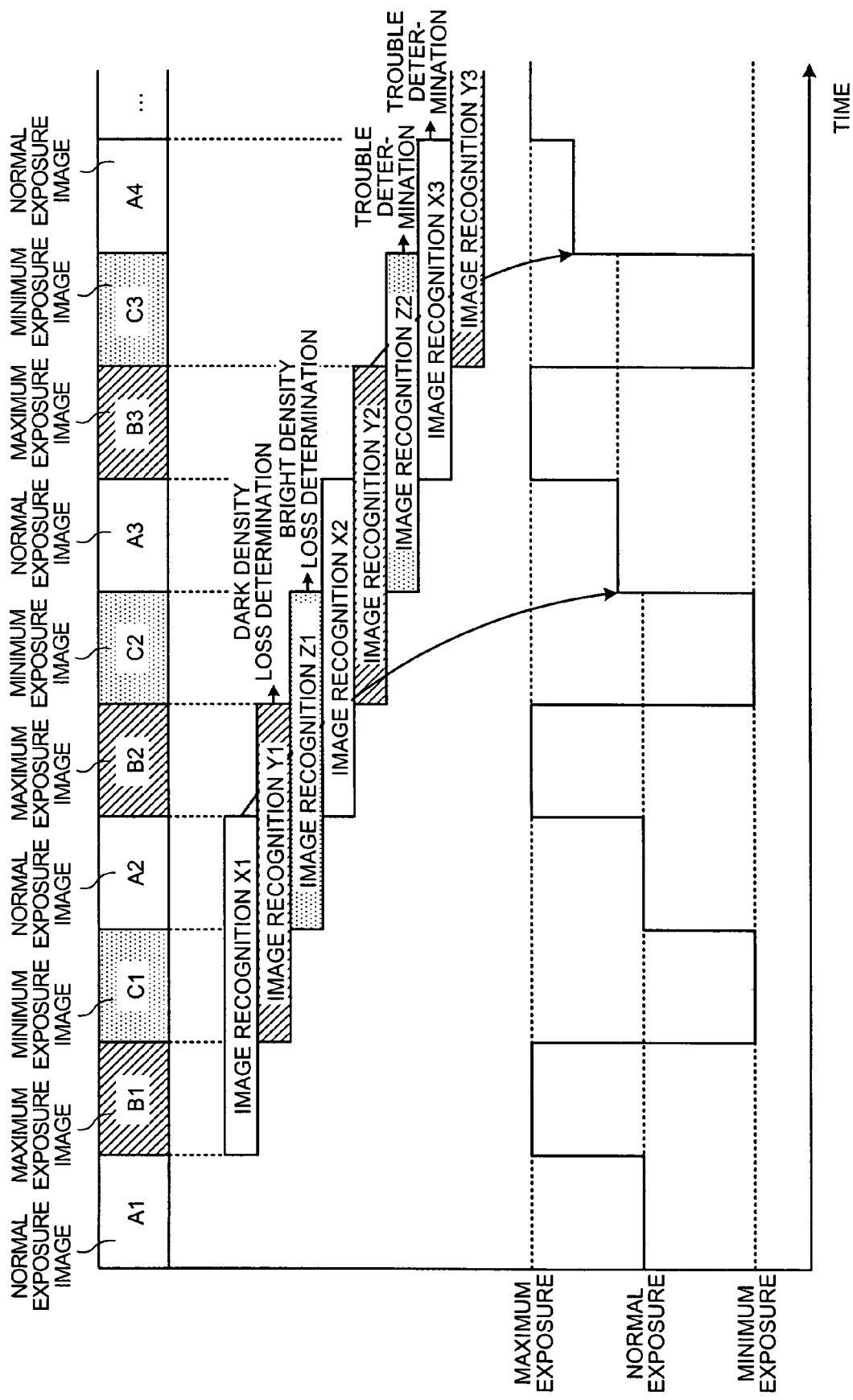

IMAGING PROCESSING DEVICE AND A METHOD OF PROCESSING AN IMAGE

BACKGROUND OF THE INVENTION

1) Field of the Invention

The present invention relates to a technology for determining a cause of an inability of processing a picked-up image.

2) Description of the Related Art

Some of the techniques that have been developed recently enable preventing running vehicles getting into accidents and assisting running and parking of the vehicles. According to these techniques, an imaging device is installed on a vehicle, and image information is collected with the imaging device on the surrounding of the vehicle while the vehicle is running. The image information is processed and used to predict accidents and prevent the vehicle getting into the accident. The imaging device is generally a camera. The amount of light that enters the cameras changes with brightness of the sun, climate, and shadows of objects so that a light source in the camera continuously adjusts itself accordingly. However, sometimes the shutter speed and the aperture control cannot follow the speed of adjustments of the light source. A density gradation loss in bright parts (hereinafter, a "bright density loss") or a density gradation loss in dark parts (hereinafter, a "dark density loss") occurs, which is beyond control of the shutter speed and the aperture.

When the camera control cannot follow the speed of changes in light source conditions or when a bright density loss or a dark density loss occurs in picked-up images that is beyond control of the camera, the picked-up image signals cannot be processed properly. In this case, it is necessary to determine that the camera has picked up the image under an abnormal state, and therefore, the image should not be processed. Assuming that the camera itself is not down, if an image is picked under an abnormal state, an image under a normal state can be picked up after a lapse of certain time. However, if the camera is down, an image in a normal state cannot be picked up. Therefore, a technique to determine whether the camera is down is required.

Moreover, a running vehicle may change directions at a high speed so that light source conditions change rapidly. Therefore, images need to be processed at a high speed. It is necessary to quickly determine and notify the vehicle driver about whether the abnormal states of picked-up images are due to a temporary environmental change or due to a trouble in the camera itself.

A conventional video camera exposure controlling device has been described in Japanese Patent Application Laid-Open No. H5-122600. This video camera exposure controlling device has a high-luminance clip circuit that sets a luminance signal of a picked-up image to the same luminance signal when the luminance signal of an input image is a preset clip level or higher. The high-luminance clip circuit changes a clip level between a low clip level to obtain proper photometric information in a backlit scene and a high clip level to obtain proper photometric information in a photographic scene other than a backlit scene. The exposure controlling device controls iris based on the photometric information from the luminance information that passes through the high-luminance clip circuit. A clip level is changed between the low clip level and the high clip level by gradually delaying the clip level or with a certain time delay.

According to the conventional technique, it is possible to obtain proper photometric information in a backlit scene by setting a luminance signal of a preset clip level or higher to the same luminance signal. However, it is not possible to determine whether the luminance signal of a preset clip level or higher is due to a temporary environmental change or due to a trouble in the camera itself.

SUMMARY OF THE INVENTION

It is an object of the present invention to solve at least the problems in the conventional technology.

An image processing device according to an aspect of the present invention includes an imaging unit that picks up an image; an image density recognizer that recognizes density of the image; and an exposure controller that in an exposure control period automatically controls an exposure of the imaging unit based on the density recognized, wherein the exposure control period includes at least a maximum exposure period during which the exposure is set to a maximum exposure, a minimum exposure period during which the exposure is set to a minimum exposure, and a normal exposure period during which the exposure is set to in between the maximum exposure and the minimum exposure; and a problem recognizer that determines any one of whether the imaging unit is abnormal and whether environment is unsuitable for picking up an image by the imaging unit based on densities of images, which are recognized by the image density recognizer, that are picked up during the maximum exposure period, the minimum exposure period, and the normal exposure period.

An image processing device according to still another aspect of the present invention includes an image obtaining unit that any one of includes an imaging unit that picks up an image of a surrounding of a vehicle and from an external device receives an image of a surrounding of a vehicle picked up by an imaging unit; an exposure controller that during an exposure control period automatically controls an exposure of the imaging unit based on a density distribution of an image obtained by the image obtaining unit, wherein the exposure automatic control period includes at least a maximum exposure period during which the exposure is set to a maximum exposure, a minimum exposure period during which the exposure is set to a minimum exposure, and a normal exposure period during which the exposure is set to in between the maximum exposure and the minimum exposure; and a determining unit that determines at least one of whether the imaging unit is abnormal and whether environment is unsuitable for picking up an image by the imaging unit, based on densities of images that are picked up during the maximum exposure period, the minimum exposure period, and/or the normal exposure period.

An operation supporting device according to still another aspect of the present invention includes an image information obtaining unit that obtains image information that has been processed by an image processing device; a supporting unit that supports running of a vehicle by any one of controlling operation of a vehicle using at least the image information and providing information to a driver; and a support operation changer that switches operation of the supporting unit upon receiving a notification that an abnormality has occurred in an imaging unit of the image processing device.

An operation supporting system according to still another aspect of the present invention include an image obtaining unit that obtains an image picked up by an imaging unit; an exposure controller that in an exposure control period automatically controls an exposure of the imaging unit based on a density distribution of an image obtained by the image obtaining unit, wherein the exposure control period includes at least a maximum exposure period during which the exposure is set to a maximum exposure, a minimum exposure period during which the exposure is set to a minimum exposure, and a normal exposure period during which the exposure is set to in between the maximum exposure and the minimum exposure; a determining unit that determines any one of whether the imaging unit is abnormal and whether environment is unsuitable for picking up an image by the imaging unit based on densities of images that are picked up during the maximum exposure period, the minimum exposure period, and/or the normal exposure period; and a supporting unit that controls operation of a vehicle using at least the image or provides information to a driver, thereby supporting running of a vehicle.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7A is an explanatory diagram of imaging with a camera that is set at a normal exposure;

FIG. 7B is an explanatory diagram of imaging with a camera that is set at a normal exposure, a maximum exposure, and a minimum exposure in this order;

DETAILED DESCRIPTION

Exemplary embodiments of an image processing device, an operation supporting device, and an operation supporting system will be explained with reference to the accompanying drawings. The present invention is not limited by the embodiments.

Figure 1:
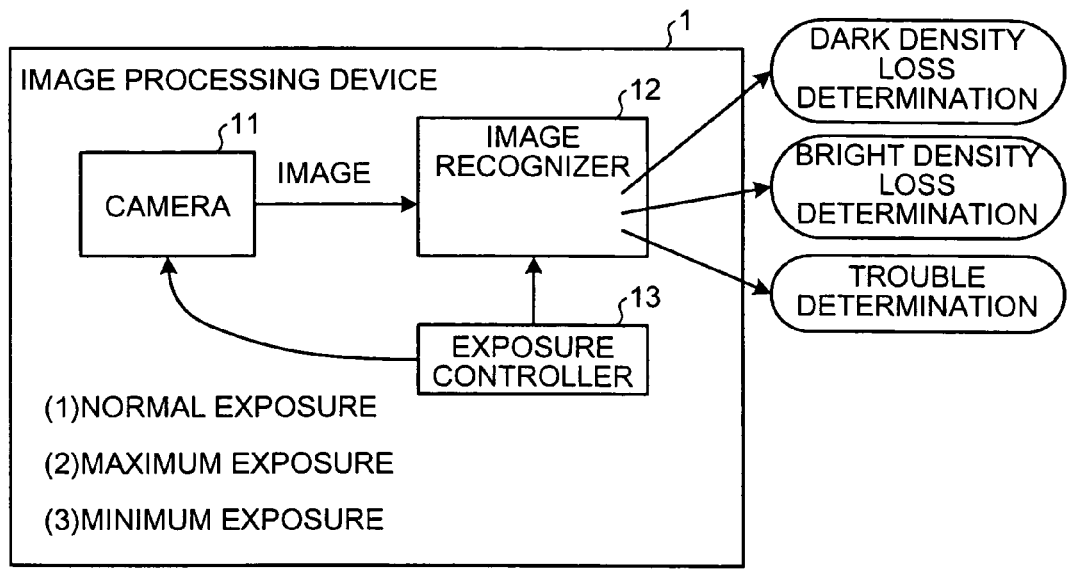
FIG. 1 is a schematic of an image processing device according to a first embodiment of the present invention.

An image processing device 1 according to a first embodiment of the present invention is explained first. FIG. 1 is a schematic of the image processing device 1 according to the first embodiment. The image processing device 1 includes at least one camera 11, an exposure controller 13, and an image recognizer 12. The exposure controller 13 controls the exposure of the camera 11 using three values of a normal exposure, a maximum exposure, and a minimum exposure according to a preset cycle. The exposure of the camera 11 is determined based on an exposure time. In other words, the exposure is broadened when the exposure time is long and the exposure is narrowed when the exposure time is short. The exposure time is determined based on the shutter speed of the camera 11. Moreover, the exposure time can be controlled at stages. For example, the shutter speed can be ⅟60 second, ⅟120 second, and ⅟240 second. Accordingly, the exposure is also controlled at stages. Moreover, the exposure can be controlled based on the aperture of the camera 11.

A normal exposure is set by occasionally controlling an exposure of an image such that the exposure comes closer to an optimum value from an exposure of the image picked up immediately before. A maximum exposure is the largest exposure that the camera 11 can control. A minimum exposure is the smallest exposure that the camera 11 can control. For example, the exposure controller 13 controls an exposure in the order of a normal exposure, a maximum exposure, and a minimum exposure at every 100 microseconds. A maximum exposure means that the exposure time is the longest. When an image is picked up at a maximum exposure, a bright density loss occurs easily. On the other hand, a minimum exposure means that the exposure time is the shortest. When an image is picked up at a minimum exposure, a dark density loss occurs easily.

The image recognizer 12 determines whether the image has a bright density loss, a smear, a dark density loss, or the like. This determination is made based on the image supplied from the camera 11 and an exposure of the camera 11 when the image is picked up with this camera 11. The bright density loss is a part where there is a density gradation loss in bright parts, and the dark density loss is a part where there is a density gradation loss in dark parts. The smear is a bright belt formed in a longitudinal direction on the image picked up with the camera 11 when a high-luminance spot light enters the imaging screen of the camera 11. The image recognizer 12 also determines whether the camera 11 has trouble.

If the image has a bright density loss, a smear, or a dark density loss, the image recognizer 12 determines whether this phenomenon is due to a temporary change of the environment or due to a trouble in the camera 11.

For example, when an image obtained at a normal exposure has a bright density loss, the image recognizer 12 determines whether an image obtained afterward at a minimum exposure under a predetermined condition also has a bright density loss. When it is determined that the image obtained at a minimum exposure also has a bright density loss, the image recognizer 12 determines that the camera 11 has trouble.

On the other hand, when an image obtained at a normal exposure has a dark density loss, the image recognizer 12 determines whether an image obtained afterward at a maximum exposure under a predetermined condition also has a dark density loss. When it is determined that the image obtained at a maximum exposure also has a dark density loss, the image recognizer 12 determines that the camera 11 has trouble. Here, the bright density loss and the dark density loss are determined based on the density gradation of the images and the number of pixels on a screen for each density gradation.

Figure 2:
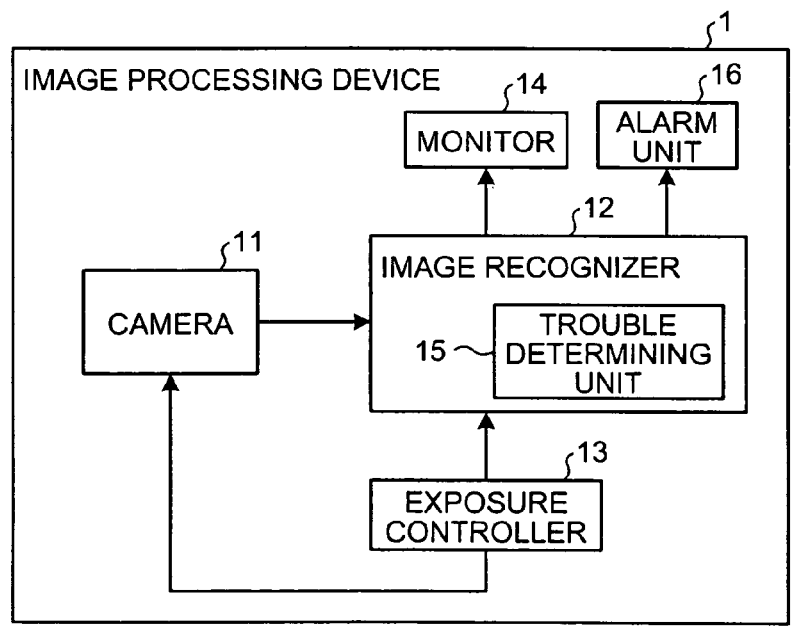
FIG. 2 is a functional block diagram of the image processing device shown in FIG. 1.

FIG. 2 is a functional block diagram of the image processing device 1. The image processing device 1 includes the camera 11, the image recognizer 12, the exposure controller 13, a monitor 14, a trouble determining unit 15, and an alarm unit 16. The monitor 14 and the alarm unit 16 are optional. Precisely, any means that outputs a result of a processing or a result of a determination made by the image recognizer 12 may be employed instead of the monitor 14 and the alarm unit 16. The camera 11 picks up images in predetermined directions such as the forward direction and the backward direction of a vehicle at a predetermined exposure, and supplies the picked-up images to the image recognizer 12 as image data.

The image recognizer 12 can communicate with the camera 11, the exposure controller 13, the monitor 14, and the alarm unit 16. The image recognizer 12 processes image data from the camera 11 and supplies the processed data to the monitor 14, and obtains a gradation of the image supplied from the camera 11 and the number of pixels on the screen for each gradation. The image recognizer 12 determines whether the image supplied from the camera 11 has a bright density loss, a smear, or a dark density loss, based on the number of pixels for each gradation of the image and the exposure information supplied from the exposure controller 13.

The trouble determining unit 15 in the image recognizer 12 determines whether the camera 11 has trouble, based on the number of pixels for each gradation of the image and the exposure information supplied from the exposure controller 13. The exposure controller 13 controls the exposure of the camera 11 in a certain cycle set in advance. The exposure controller 13 controls to change the exposure of the camera 11 using the three values of the normal exposure, the maximum exposure, and the minimum exposure according to the predetermined cycle.

The monitor 14 displays an image obtained from the image data processed by the image recognizer 12. When the trouble determining unit 15 determines that the camera 11 has trouble, the alarm unit 16 notifies the user of the image processing device 1 about the trouble in the camera 11 using an alarm lamp, an alarm sound, or an alarm display. While the monitor 14 and the alarm unit 16 are separately provided according to the first embodiment, the monitor 14 may include the alarm unit 16.

Figure 3:
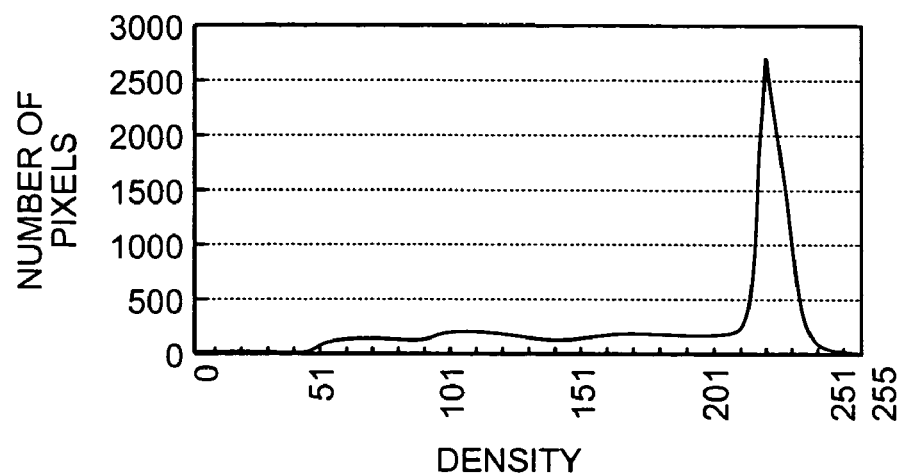
FIG. 3 is an example of a density histogram when an image is too bright.
Figure 4:
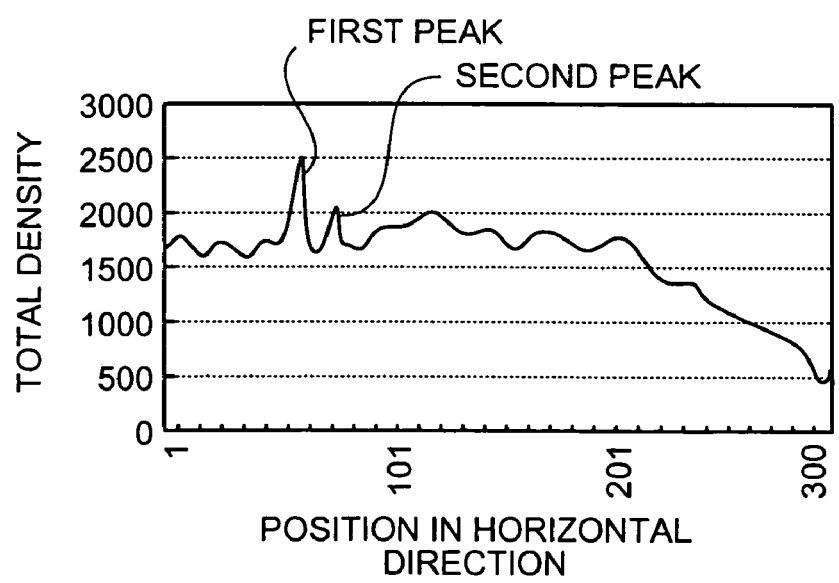
FIG. 4 is an explanatory diagram for explaining detection of a smear that occurs in an image.
Figure 5:
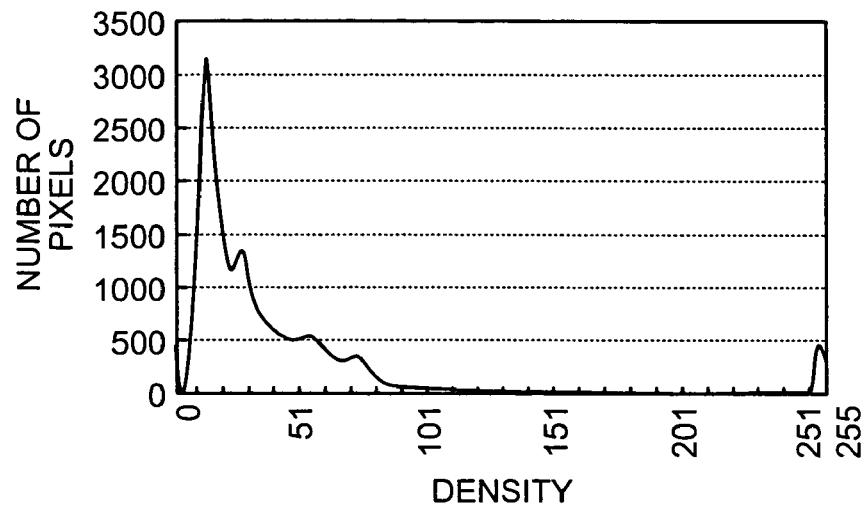
FIG. 5 is an example of a density histogram when an image is too dark.

A relationship between a gradation of an image recognized by the image recognizer shown in FIG. 2 and the number of pixels in each gradation is explained next. FIG. 3 to FIG. 5 are density histograms. A density histogram is a luminance distribution of an image. The abscissa axis represents a gradation of density that indicates brightness of image data converted into a digital value. The gradation is expressed in 0 (black) to 255 (white), for example. The ordinate axis represents the number of pixels corresponding to a density.

FIG. 3 is an example of a density histogram when an image is too bright. When an image is picked up against light or when the exposure of the camera 11 is larger than a proper value, the number of pixels with high density becomes large. For example, it is determined that an image has a bright density loss when a proportion of the number of pixels with density 201 or above to a total number of pixels is equal to or larger than a predetermined value. Alternatively, it can be determined whether an image has a bright density loss, based on an average of a total density of the image. For example, it is determined that the image has a bright density loss when the average of the total density of the image is 201 or above.

Density of an image when a smear occurs in the image is explained. The image is divided by vertical straight lines, and pixels at positions in the same horizontal direction of the image are grouped as one block. A total density of pixels in each block is then obtained. For example, when there are 300 pixels in the horizontal direction of the image, the image is equally divided into 300 blocks by vertical straight lines. A total value of the density of the pixels within each block is then obtained.

FIG. 4 is an explanatory diagram of a detection of a smear that occurs in the image. In FIG. 4, the abscissa axis represents a position of the image in a horizontal direction, and the ordinate axis represents a total value of density of pixels in each block. Presence or absence of a density peak in FIG. 4 is determined. When a density peak is present, this is extracted as a first peak. Presence or absence of a density peak at both positions of ±n pixels (where n is a certain natural number) from the first peak is determined. When a density peak is present, this is extracted as a second peak. When an absolute value of a difference between a total value of the density of the first peak and a total value of the density of the second peak is equal to or larger than a predetermined value, either the first peak or the second peak that has a larger total value of the density is determined as a smear.

FIG. 5 is an example of a density histogram when an image is too dark. When an image is picked up without a light source or when the exposure of the camera 11 is smaller than a proper value, the number of pixels with low density becomes large. For example, it is determined that an image has a dark density loss when a proportion of the number of pixels with density less than 51 to a total number of pixels is equal to or larger than a predetermined value. Alternatively, it can be determined whether an image has a dark density loss, based on an average of a total density of the image. For example, it is determined that the image has a dark density loss when the average of the total density of the image is 51 or below.

Figure 6:
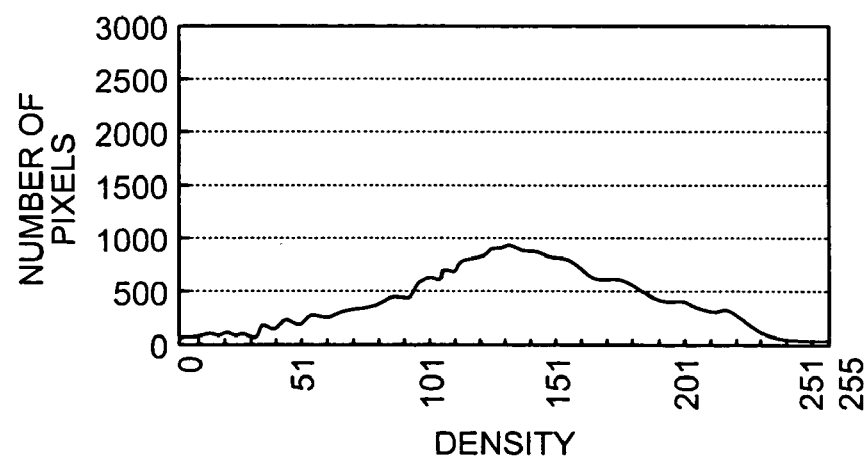
FIG. 6 is an example of a density histogram when exposure balance is good.

FIG. 6 is an example of a density histogram when an exposure balance is good. When an image is picked up at a proper exposure of the camera 11 with respect to a light source, the number of pixels with high density and the number of pixels with low density are distributed without a deviation.

A procedure of controlling exposure by the exposure controller 13 is explained next. FIG. 7A is an explanatory diagram of imaging with the camera 11 that is set at a normal exposure, and FIG. 7B is an explanatory diagram of imaging with a camera 11 that is set at a normal exposure, a maximum exposure, and a minimum exposure in this order. The exposure controller 13 controls to change the exposure at a certain time interval. The exposure control is explained based on the assumption that the camera 11 picks up one image at a rate of once per 33 milliseconds and that it takes 100 milliseconds for the image recognizer 12 to recognize the density of the image.

FIG. 7A is an explanatory diagram of the exposure control when images are picked up at a normal exposure (hereinafter, a "normal exposure image") at every 33 milliseconds (i.e., picking up 30 images during one second) and that the density of each picked-up image is recognized at every 100 milliseconds. Each time when an image is recognized, the exposure is changed to become closer to an optimum value than the exposure of the image picked up immediately before. Since 100 milliseconds are required to recognize the density of the image, the changing of the exposure of the image is delayed by 100 milliseconds.

Density of a normal exposure image A1 is recognized during a period of image recognition X1, and density of a normal exposure image A2 is recognized during a period of image recognition X2. Thereafter, in a similar manner, density of a normal exposure image A3 is recognized during a period of image recognition X3, density of a normal exposure image A4 is recognized during a period of image recognition X4, and density of a normal exposure image A5 is recognized during a period of image recognition X5.

After recognizing the density of the normal exposure image A1 during the image recognition X1, the camera 11 picks up the normal exposure image A5 by changing the normal exposure of the camera to become closer to an optimum value based on this density recognition. After recognizing the density of the normal exposure image A2 during the image recognition X2, the camera 11 picks up a normal exposure image A6 by changing the normal exposure of the camera to become closer to the optimum value based on this density recognition. After recognizing the density of the normal exposure image A3 during the image recognition X3, the camera 11 picks up a normal exposure image A7 by changing the normal exposure of the camera to become closer to the optimum value based on this density recognition. Thereafter, in a similar manner, after recognizing the density of a normal exposure image, the camera 11 picks up a normal exposure image by changing the exposure of the camera to become closer to the optimum value based on this density recognition. The camera repeats a similar operation.

In the above example, it is determined during the image recognition X1 that a density distribution of the picked-up normal exposure image A1 deviates to a dark density. Therefore, the camera 11 picks up the normal exposure image A5 by changing the exposure to a level one stage higher than the exposure of the normal exposure images A1 to A4 respectively.

In the above example, it is also determined during the image recognition X2 that a density distribution of the picked-up normal exposure image A2 deviates to a dark density. Therefore, the camera 11 picks up the normal exposure image A6 by changing the exposure to that one stage higher than the exposure of the normal exposure image A5.

In the above example, it is also determined during the image recognition X3 that a density distribution of the picked-up normal exposure image A3 deviates to a dark density. Although the image density distribution is determined to deviate to a dark density, the camera 11 picks up the normal exposure image A6 at the same maximum exposure as that of the normal exposure image A5, because the normal exposure image A5 is picked up at the maximum exposure.

As explained above, when a density distribution of a picked-up image is determined to deviate to a dark density, the exposure is changed to a higher level by each predetermined stage. Even when an output image has a dark density loss due to a trouble in the camera 11, this staged change of the exposure is carried out. Therefore, even when the camera 11 has trouble, the camera 11 does not pick up images at the maximum exposure until the normal exposure image A6 is picked up since the normal exposure image A1 is picked up.

It is not possible to detect that the camera 11 has trouble unless the camera 11 continues to pick up images at the maximum exposure during a predetermined period after the normal exposure image A1 is picked up and unless a determination is continuously made that the images have a dark density loss from the density distribution of the images picked up during this period.

When the images have a dark density loss, it is difficult to determine whether the dark density loss in the images is due to a temporal environmental change and to forecast recovery of the image processing device 1 to a normal state after a lapse of a predetermined time, or whether the image processing device 1 cannot recover to a normal state after a lapse of a predetermined time due to a trouble in the camera 11.

When the image recognizer 12 determines that density distribution of an image deviates to a bright density, the exposure of the next image to be picked up is changed to a lower level by one stage. When the image recognizer 12 determines that density distribution of an image is proper, the exposure of the next image to be picked up is not changed.

FIG. 7B is an explanatory diagram of the exposure control when images are picked up sequentially in the order of a normal exposure image, an image at a maximum exposure (hereinafter, a "maximum exposure image"), and an image at a minimum exposure (hereinafter, a "minimum exposure image") at every 33 milliseconds and when the density of each normal exposure image is recognized at every 100 milliseconds.

Each time when a normal exposure image is recognized, the exposure is changed to become closer to an optimum value than the normal exposure of the normal exposure image picked up immediately before. Since a normal exposure image, a maximum exposure image, and a minimum exposure image are picked up in order at every 33 milliseconds and since the density of each image is recognized at every 100 milliseconds, the changing of the exposure of the image is delayed by 167 milliseconds.

Density of the normal exposure image A1 is recognized during the image recognition X1, and density of the normal exposure image A2 is recognized during the image recognition X2. Density of the normal exposure image A3 is recognized during the image recognition X3. Thereafter, in a similar manner, density of a normal exposure image is recognized during 100 milliseconds after the image is picked up.

After recognizing the density of the normal exposure image A1 during the image recognition X1, the camera 11 picks up the normal exposure image A3 by changing the normal exposure of the camera to become closer to an optimum value based on this density recognition. After recognizing the density of the normal exposure image A2 during the image recognition X2, the camera 11 picks up the normal exposure image A4 by changing the normal exposure of the camera to become closer to the optimum value based on this density recognition. After recognizing the density of the normal exposure image A3 during the image recognition X3, the camera 11 picks up the normal exposure image A5 (not shown) by changing the normal exposure of the camera to become closer to the optimum value based on this density recognition. Thereafter, in a similar manner, after recognizing the density of a normal exposure image, the camera 11 picks up a normal exposure image by changing the normal exposure of the camera to become closer to the optimum value based on this density recognition. The camera 11 repeats a similar operation.

The camera 11 picks up a maximum exposure image B1 and a minimum exposure image C1 after the normal exposure image A1. The camera 11 further picks up a maximum exposure image B2 and a minimum exposure image C2 after the normal exposure image A2.

Density of the maximum exposure image B1 is recognized during a period of image recognition Y1, and density of the maximum exposure image B2 is recognized during a period of image recognition Y2. Density of a maximum exposure image B3 is recognized during a period of image recognition Y3. Thereafter, in a similar manner, density of a maximum exposure image is recognized during 100 milliseconds after the maximum exposure image is picked up.

Density of the minimum exposure image C1 is recognized during a period of image recognition Z1, and density of the minimum exposure image C2 is recognized during a period of image recognition Z2. Thereafter, in a similar manner, density of a minimum exposure image is recognized during 100 milliseconds after the minimum exposure image is picked up.

Trouble in the camera 11 is determined by recognizing the density of the maximum exposure image B1 during the image recognition Y1 and the density of the maximum exposure image B2 during the image recognition Y2. Thereafter, whether the camera 11 has trouble is determined by recognizing twice the density of the maximum exposure images in a similar manner.

The above is an example of a determination made that the density distribution of the picked-up normal exposure image A1 deviates to a dark density during the image recognition X1. Therefore, the normal exposure image A3 is picked up by changing the exposure to a level one stage higher than the exposure of the normal exposure images A1 and A2.

Even when the normal exposure image A1 has a dark density loss due to a low setting of the exposure, the normal exposure image A2 can be picked up as an image without a dark density loss by optimizing the normal exposure, if the maximum exposure image B1 does not have a dark density loss. Therefore, the image processing device 1 thereafter continues a normal operation of picking up images in the order of a maximum exposure and a minimum exposure while changing the normal exposure. As explained above, when the exposure is optimized based on the first maximum exposure image B1, it is possible to determine whether an image can be picked up without a dark density loss (hereinafter, "dark density loss determination"). In order to increase precision of the determination on whether a picked-up image has a dark density loss, a dark density loss determination can be made after picking up a plurality of maximum exposure images.

On the other hand, when the maximum exposure image B1 picked up at a maximum exposure has a dark density loss, it is determined that this is due to the fact that the image is picked up in the environment not suitable for imaging of which exposure is beyond control of the camera 11 (hereinafter, a "marginal environment") or that the camera 11 has trouble.

When it is determined that the dark density loss is due to a marginal environment or due to a trouble in the camera 11, the true cause is determined based on the next maximum exposure image B2 (hereinafter, "trouble determination"). As one of methods for discriminating the causes between a marginal environment and a trouble in the camera 11, a light source is installed in front of the camera 11 that enables the camera 11 to pick up an image without a dark density loss in any dark environment when the camera 11 is set at the maximum exposure.

At the time of picking up the next maximum exposure image B2, the camera 11 picks up an image of this light source. When the camera 11 can pick up the image of the light source at the maximum exposure without a dark density loss, it is determined that the image is picked up in a marginal environment. When the camera 11 picks up the image of this light source with a dark density loss at the maximum exposure, it is determined that the camera 11 has trouble.

When the concentration of brightness due to a headlight installed on the vehicle other than the light source installed in front of the camera 11 is recognized, it can be determined that the image is picked up in a marginal environment. When the concentration of brightness due to the headlight installed on the vehicle cannot be recognized, it can be determined that the camera 11 has trouble.

It can be determined that the image is picked up in a marginal environment or the camera 11 has trouble, by considering information on a time zone (day and night) in which the vehicle is running and a running of a vehicle environment (such as raining, snowing, in a fog, or in a tunnel). In order to increase precision of determination on whether the camera 11 has trouble, a plurality of maximum exposure images are picked up, so as to determine that the image is picked up in a marginal environment or the camera 11 has trouble.

When it is determined that the image is picked up in a marginal environment, change of the environment to the imaging environment in which the camera 11 can control the exposure is awaited. On the other hand, when it is determined that the camera 11 having trouble picks up the image, the alarm unit 16 of the image processing device 1 notifies the user of the image processing device 1 about the trouble in the camera 11. The alarm unit 16 may notify the user of the image processing device 1 about a marginal environment.

As explained above, even when the normal exposure image A1 has a dark density loss, it can be determined whether the dark density loss occurs due to a small exposure, because the camera 11 picks up the maximum exposure image B1 after picking up the normal exposure image A1.

Since the light source is installed in front of the camera 11 that enables the camera 11 to pick up an image without a dark density loss in any dark environment when the camera 11 is set at the maximum exposure, and since the camera 11 picks up an image of this light source at the time of picking up the maximum exposure image B2, it can be determined whether the camera 11 has trouble even when the maximum exposure image B1 has a dark density loss.

Whether the camera 11 has trouble is determined next by recognizing the density of the minimum exposure image C1 during the image recognition Z1 and the density of the minimum exposure image C2 during the image recognition Z2. Thereafter, whether the camera 11 has trouble is determined by recognizing twice the density of the minimum exposure images in a similar manner.

Even when the normal exposure image A1 has a bright density loss due to a high setting of the exposure, the normal exposure image A2 can be picked up as an image without a bright density loss by optimizing the normal exposure, if the minimum exposure image C1 does not have a bright density loss. Therefore, the image processing device 1 thereafter continues a normal operation of picking up images in the order of a maximum exposure and a minimum exposure while changing the normal exposure. As explained above, when the exposure is optimized based on the first minimum exposure image C1, it is possible to determine whether an image can be picked up without a bright density loss (hereinafter, "bright density loss determination"). In order to increase precision of the determination on whether a picked-up image has a bright density loss, a bright density loss determination can be made after picking up a plurality of minimum exposure images.

On the other hand, when the minimum exposure image C1 picked up at a minimum exposure has a bright density loss, it is determined that this is due to the fact that the image is picked up in the marginal environment or that the camera 11 has trouble. When it is determined that the bright density loss is due to a marginal environment or due to a trouble in the camera 11, the trouble determination is performed based on the next minimum exposure image C2.

As a method for discriminating the causes between a marginal environment and a trouble in the camera 11, the exposure is set as close to zero second as possible. Alternatively, the front side of the camera 11 is shielded with a black board or the like to cut light from the outside, thereby enabling the camera 11 to pick up an image without a bright density loss at the minimum exposure even in a bright environment such as a backlight.

At the time of picking up the next minimum exposure image C2, the camera 11 picks up this image without bright density loss. When the camera 11 can pick up the image of the light source at the minimum exposure without a bright density loss, it is determined that the image is picked up in a marginal environment. When the camera 11 picks up the image of this backlight with a bright density loss at the minimum exposure, it is determined that the camera 11 has trouble.

It can be determined that the image is picked up in a marginal environment or the camera 11 has trouble, by considering information on a time zone (day and night) in which the vehicle is running and a running of a vehicle environment (such as raining, snowing, in a fog, or in a tunnel). In order to increase precision of determination on whether the camera 11 has trouble, a plurality of minimum exposure images are picked up, and then it can be determined that the image is picked up in a marginal environment or the camera 11 has trouble.

When it is determined that the image is picked up in a marginal environment, change of the environment to the imaging environment in which the camera 11 can control the exposure is awaited. On the other hand, when it is determined that the camera 11 having trouble picks up the image, the alarm unit 16 of the image processing device 1 notifies the user of the image processing device 1 about the trouble in the camera 11.

As explained above, even when the normal exposure image A1 has a bright density loss, it can be determined whether the bright density loss occurs due to a large exposure, because the camera 11 picks up the minimum exposure image C1 after picking up the normal exposure image A1.

Since the camera 11 picks up the minimum exposure image C2 without a bright density loss in any bright environment when the camera 11 is set at the minimum exposure, it can be determined whether the camera 11 has trouble even when the minimum exposure image C1 has a bright density loss.

When it is determined that a smear or a ghost occurs in the normal exposure image A1, an image without a smear or a ghost can be picked up by optimizing the exposure when the minimum exposure image C1 does not have a bright density loss. Therefore, the image processing device 1 continues the operation.

When a smear or a ghost occurs in the minimum exposure image C1, it is determined that this is due to either a marginal environment or a trouble in the camera 11. Whether the smear or the ghost is due to a trouble in the camera 11 is determined based on imaging of the minimum exposure image C2. An image with a smear or ghost is often erroneously recognized as a white line or the like on the road. Therefore, a device that guides a vehicle by processing image data from the image processing device 1 does not use an image with a smear.

Figure 8:
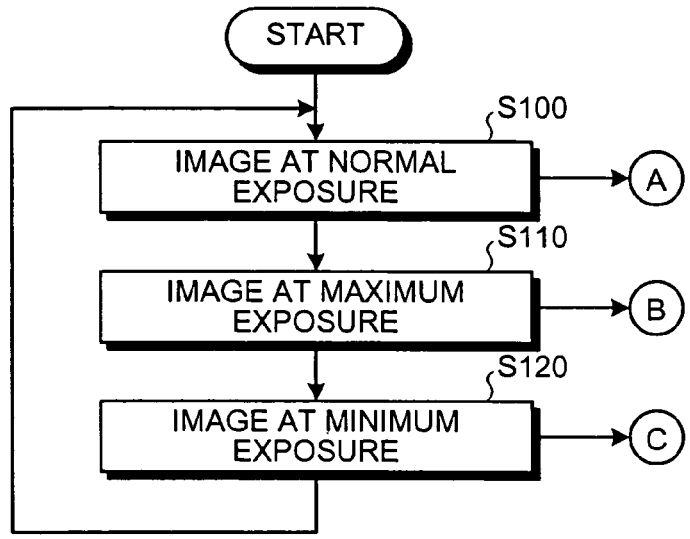
FIG. 8 is a flowchart of operations performed by the image processing device shown in FIG. 1.

The operation of the image processing device shown in FIG. 2 is explained next. FIG. 8 is a flowchart of the operation of the image processing device. The exposure controller 13 controls the exposure of the camera 11 to become a normal exposure, and the camera 11 picks up an image at a normal exposure and obtains a normal exposure image (step S100). The image recognizer 12 recognizes the density of the picked-up normal exposure image.

The exposure controller 13 controls the exposure of the camera 11 to become a maximum exposure, and the camera 11 picks up an image at the maximum exposure and obtains a maximum exposure image (step S110). The image recognizer 12 recognizes the density of the picked-up maximum exposure image.

The exposure controller 13 finally controls the exposure of the camera 11 so that the exposure is the minimum exposure, and the camera 11 picks up an image at the minimum exposure and obtains a minimum exposure image (step S120). The image recognizer 12 recognizes the density of the picked-up minimum exposure image.

The exposure controller 13 thereafter controls the exposure in the order of a normal exposure, a maximum exposure, and a minimum exposure. The camera 11 picks up images in the order of a normal exposure image, a maximum exposure image, and a minimum exposure image.

Figure 9A:
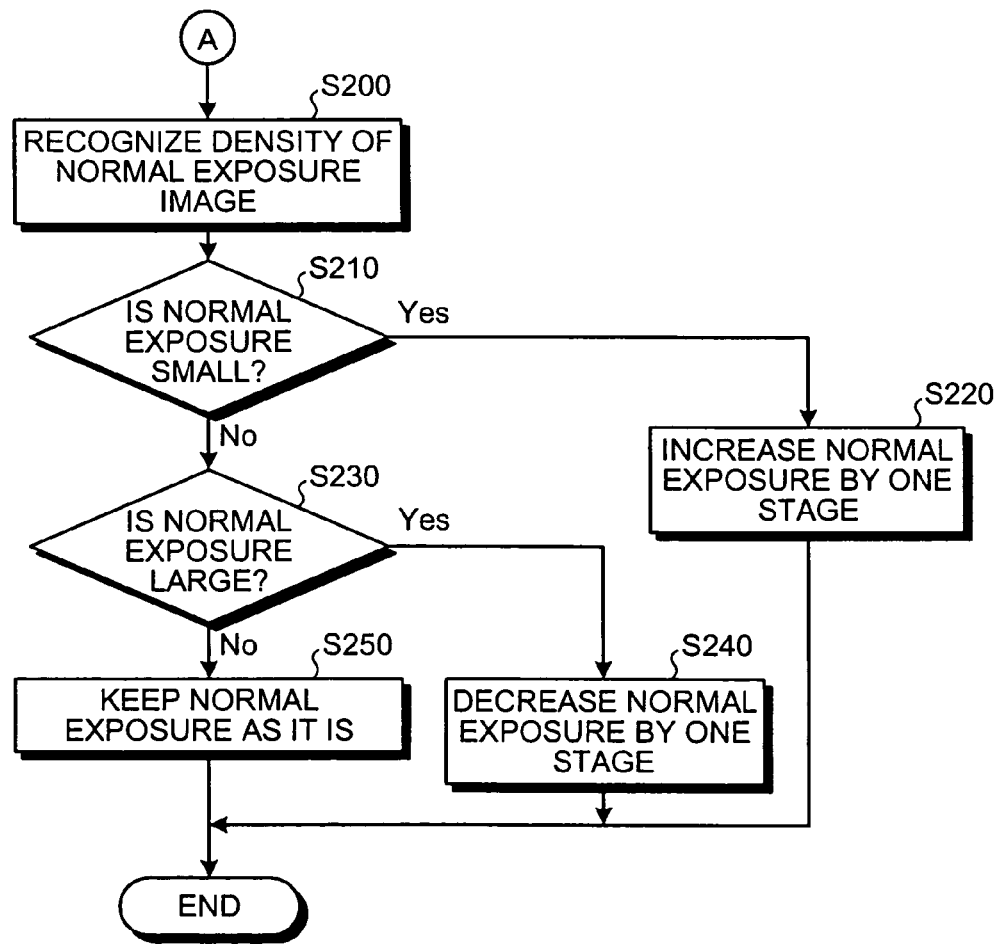
FIG. 9A is a flowchart of operations for changing an exposure to pick up an image of a normal exposure.

FIG. 9A is a detailed flowchart of operations for changing a normal exposure to pick up a normal exposure image. The image recognizer 12 recognizes density of a normal exposure image picked up with the camera 11 (step S200). When the exposure of the picked-up normal exposure image is determined to be small by recognizing the density (Yes at step S210), the camera 11 picks up the next normal exposure image after the density recognition by increasing the normal exposure by one stage (step S220).

On the other hand, when the exposure of the picked-up normal exposure image is determined to be large by recognizing the density (Yes at step S230), the camera 11 picks up the next normal exposure image after the density recognition by decreasing the normal exposure by one stage (step S240). When the exposure of the picked-up normal exposure image is determined to be proper by recognizing the density, the camera 11 picks up the next normal exposure image without changing the exposure (step S250).

Figure 9B:
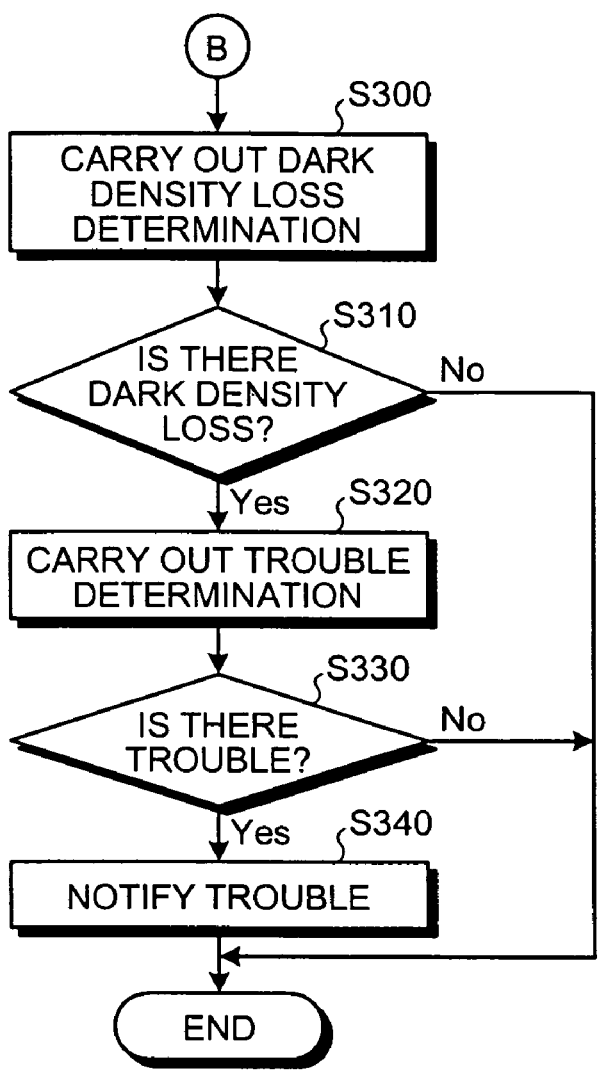
FIG. 9B is a flowchart of operations for making a trouble determination of a camera by recognizing a density of an image of a maximum exposure.

FIG. 9B is a detailed flowchart of operations for making a trouble determination of a camera by recognizing the density of a maximum exposure image. The image recognizer 12 recognizes the density of a maximum exposure image picked up with the camera 11. The image recognizer 12 then determines whether the maximum exposure image has a dark density loss by recognizing the density (step S300). When it is determined that the maximum exposure image has a dark density loss (Yes at step S310), the trouble determination of the camera 11 is carried out at the time of picking up the next maximum exposure image after the density recognition (step S320). On the other hand, when it is determined that the maximum exposure image does not have a dark density loss at step S310, a dark density loss determination is carried out again at the time of picking up the next maximum exposure image after the density recognition. The trouble determination of the camera 11 is carried out by picking up an image of the light source installed in front of the camera 11.

When it is determined that the camera 11 does not have trouble as a result of the trouble determination (No at step S330), the dark density loss in the picked-up image is due to a marginal environment. The camera 11 then picks up the next maximum exposure image instead of picking up an image of the light source installed in front of the camera 11, and a dark density loss determination about this image is carried out. On the other hand, when it is determined that the camera 11 has trouble as a result of the trouble determination of the camera 11 (Yes at step S330), the alarm unit 16 notifies the user of the image processing device about the trouble in the camera 11 (step S340).

Figure 9C:
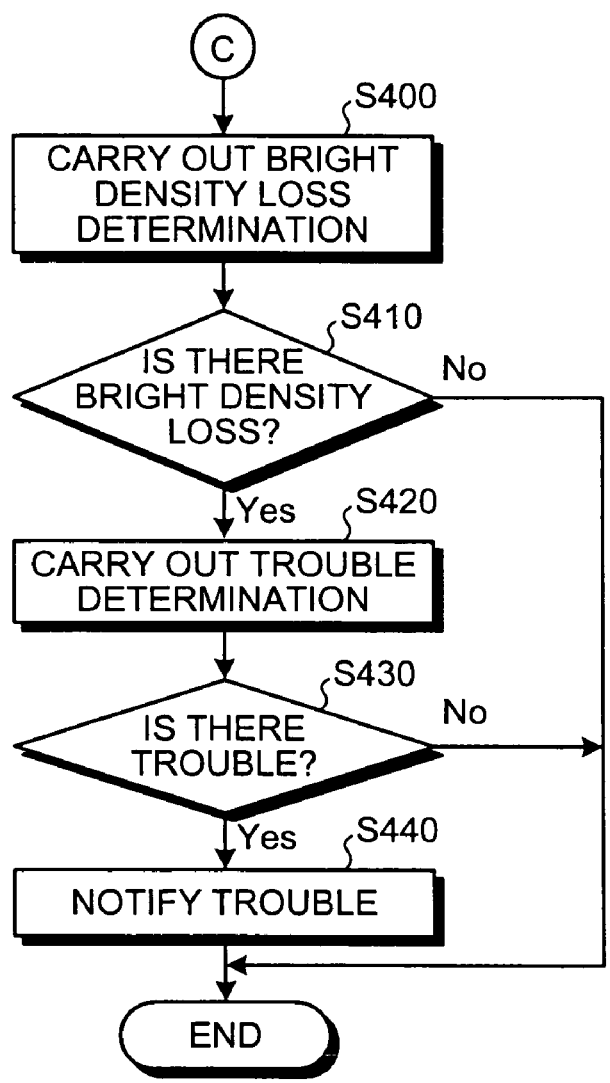
FIG. 9C is a flowchart of operations for making a trouble determination of a camera by recognizing a density of an image of a minimum exposure.

FIG. 9C is a detailed flowchart of operations for making a trouble determination of a camera by recognizing the density of a minimum exposure image. The image recognizer 12 recognizes the density of a minimum exposure image picked up with the camera 11. The image recognizer 12 determines whether the minimum exposure image has a bright density loss by recognizing the density (step S400). When it is determined that the minimum exposure image has a bright density loss (Yes at step S410), the trouble determination of the camera 11 is carried out at the time of picking up the next minimum exposure image after the density recognition (step S420). On the other hand, when it is determined that the minimum exposure image does not have a bright density loss at step S410, a bright density loss determination is carried out again at the time of picking up the next minimum exposure image after the density recognition. The trouble determination of the camera 11 is carried out by picking up an image in a state that no external light enters the camera 11.

When it is determined that the camera 11 does not have trouble as a result of the trouble determination (No at step S430), the bright density loss in the picked-up image is due to a marginal environment. The camera 11 then picks up the next minimum exposure image not in the state that no external light enters the camera 11, and a bright density loss determination about this image is carried out. On the other hand, when it is determined that the camera 11 has trouble as a result of the trouble determination (Yes at step S430), the alarm unit 16 notifies the user of the image processing device about the trouble in the camera 11 (step S440).

According to the first embodiment, density of an image is recognized after the image is picked up. When an interlace system is employed in which odd lines and even lines are scanned separately for a picked-up image or a screen display, a density recognition and a trouble determination of the camera 11 can be carried out using an image obtained at one-time scanning. For example, when odd lines are scanned first and even lines are scanned next time, density of an image may be recognized using the image obtained at the first scanning. This reduces the time required for recognizing the density of the image.

When picking up an image with a maximum exposure, the imaging environment can be differentiated between the first and the second imaging such that a dark density loss determination is carried out using the image obtained at the first scanning and the trouble determination of the camera 11 is carried out using the image obtained at the second scanning. Similarly, when picking up an image with a minimum exposure, the imaging environment can be differentiated between the first and the second imaging such that a bright density loss determination is carried out using the image obtained at the first scanning and the trouble determination of the camera 11 is carried out using the image obtained at the second scanning.

While the camera 11 picks up one image at every 33 milliseconds according to the first embodiment, the imaging interval is not limited to 33 milliseconds, and the camera 11 can pick up one image at a longer or shorter time interval. While the image recognizer 12 requires 100 milliseconds to recognize the density of an image according to the first embodiment, the image density recognizing time is not limited to 100 milliseconds, and the image recognizer 12 can recognize the density of the image in a shorter or longer time than 100 milliseconds. When it takes a shorter time to recognize the density of the image, a delay time of changing the normal exposure since the picking up of the image becomes shorter.

While images are picked up in the order of a normal exposure image, a maximum exposure image, and a minimum exposure image according to the first embodiment, the imaging order is not limited to this. For example, images can be picked up in the order of a normal exposure image, a minimum exposure image, and a maximum exposure image.

While a normal exposure image, a maximum exposure image, and a minimum exposure image are picked up at an equal time interval according to the first embodiment, the imaging time interval is not limited to be equal. For example, after about ten normal exposure images are picked up, one maximum exposure image and one minimum exposure image can be picked up. With this arrangement, more normal exposure images can be picked up than those when the imaging time interval is equal. Therefore, precision of the recognition of the density of the normal exposure image improves. Consequently, more image data is used to process the picked-up images.

According to the first embodiment, a marginal-environment determination or a trouble determination of the camera 11 is carried out after carrying out a dark density loss determination or a bright density loss determination. Alternatively, a dark density loss determination or a bright density loss determination can be carried out when the imaging environment is determined to be a marginal environment after carrying out a marginal-environment determination and a trouble determination of the camera 11.

While images are picked up in the order of a normal exposure image, a maximum exposure image, and a minimum exposure image according to the first embodiment, a maximum exposure image and a minimum exposure image can be picked up to carry out a dark density loss determination, a bright density loss determination, and a trouble determination of the camera 11 only in a situation that the density of a normal exposure image is not within a predetermined value lasts for a predetermined number of times.

As explained above, according to the first embodiment, a maximum exposure image and a minimum exposure image are picked up after picking up a normal exposure image. Therefore, a dark density loss determination, a bright density loss determination, a marginal-environment determination, and a trouble determination of the camera 11 can be carried out in a short time, even in a state that the imaging environment easily changes.

An image processing device and an operation supporting system that uses the image processing device is explained below a second embodiment of the present invention. According to the first embodiment, three exposures of a normal exposure, a maximum exposure, and a minimum exposure are changed over at a predetermined cycle. However, in the image processing device according to the second embodiment, timing and an interval of changing over to a maximum exposure and a minimum exposure can be changed.

Figure 10:
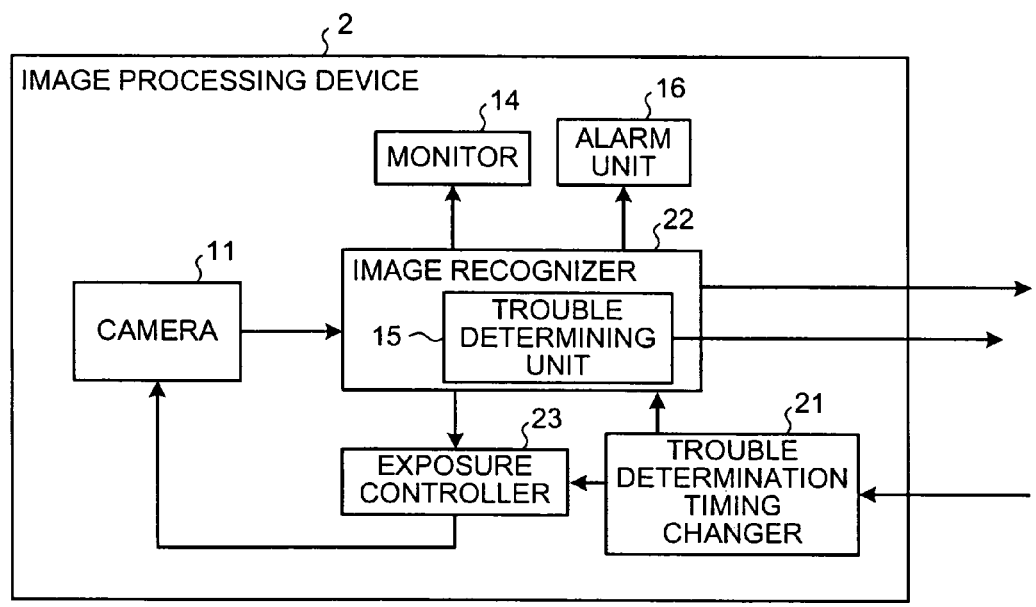
FIG. 10 is a functional block diagram of an image processing device according to a second embodiment of the present invention.

An image processing device 2 according to the second embodiment is shown in FIG. 10. The image processing device 2 includes a trouble determination timing changer 21. The trouble determination timing changer 21 receives a control signal from the outside, and controls the operation of an exposure controller 23, that is, changing of a normal exposure, a maximum exposure, and a minimum exposure. The trouble determination timing changer 21 notifies an image recognizer 22 about a timing at which a maximum exposure and a minimum exposure are inserted.

The image recognizer 22 uses an obtained image for the trouble determination by the trouble determining unit 15 based on the notification from the trouble determination timing changer 21. The image recognizer 22 carries out a predetermined processing to a picked-up normal exposure image and outputs a processed result to the outside, and outputs a result of a determination made by the trouble determining unit 15 to the outside.

Other configurations and the operation of the image processing device are similar to those of the image processing device 1 shown in FIG. 2. Therefore, like configuration elements are designated by like reference signs, and their explanation is omitted.

Figure 11:
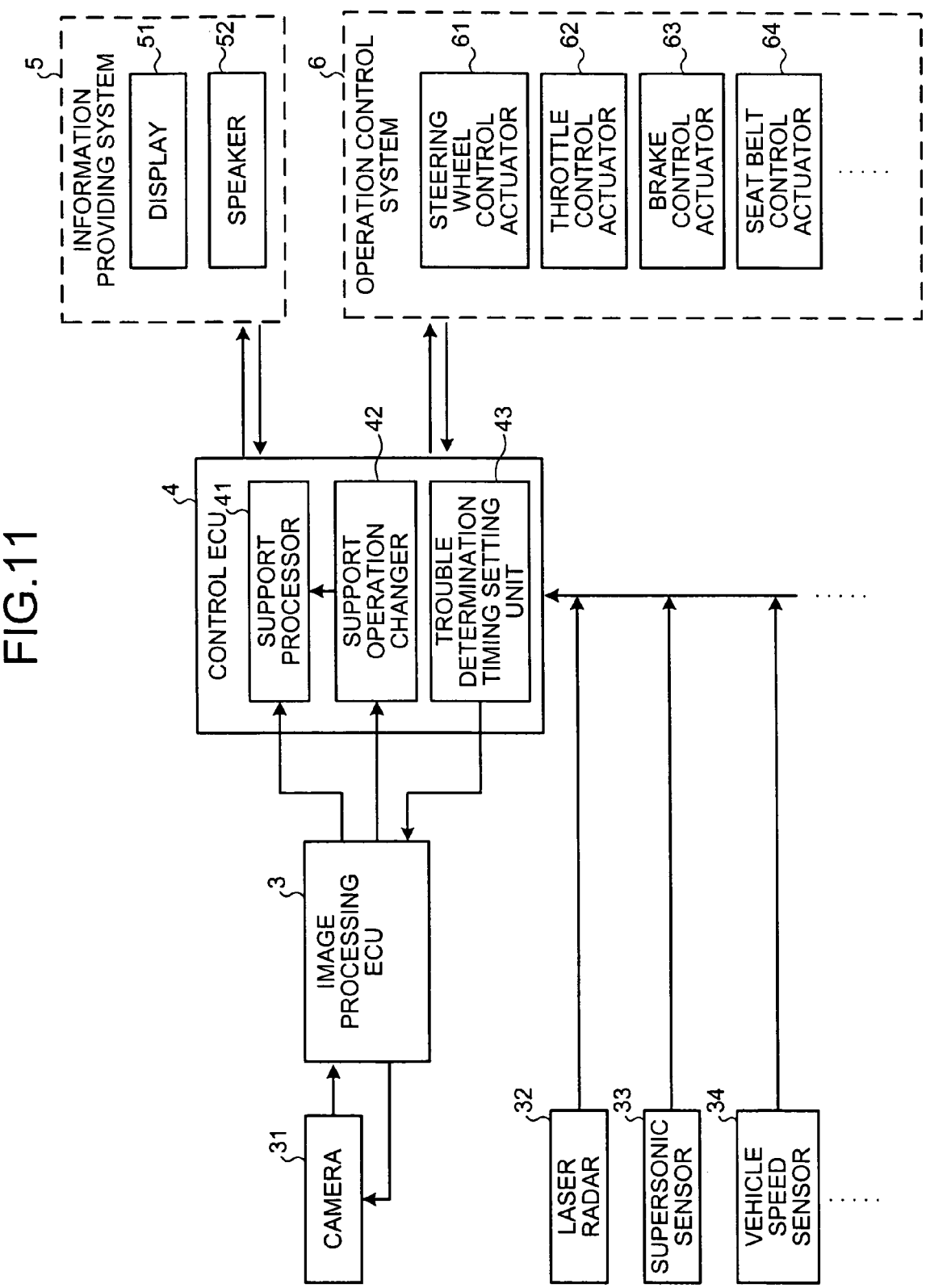
FIG. 11 is a functional block diagram of an operation supporting system according to the second embodiment.

The operation supporting system built in with the image processing device according to the first and the second embodiments is shown in FIG. 11. The operation supporting system includes an image processing electrical control unit (ECU) 3 that corresponds to the image processing device according to the first and the second embodiments. The image processing ECU 3 obtains an image picked up with an external camera 31, processes the image and carries out a trouble determination, and outputs a result to a control ECU 4. The image processing ECU 3 receives a control signal from the control ECU 4, and controls the switching operation of a maximum exposure and a minimum exposure.

The control ECU 4 functions as an operation supporting device that obtains various kinds of information, and controls the operation of the vehicle or provides the information to the driver to support running of a vehicle. Specifically, the control ECU 4 is connected to the image processing ECU 3, various detectors such as a laser radar 32, a supersonic sensor 33, and a vehicle speed sensor 34, an information providing system 5 that provides information to the driver, and an operation control system 6 that controls the operation of the vehicle.

The information providing system 5 includes a display 51 and a speaker 52. The information providing system 5 is preferably shared with other on-board systems such as a navigation system and a vehicle audio system.

The operation control system 6 includes a steering wheel control actuator 61 that controls the operation of the steering wheel, a throttle control actuator 62 that controls a throttle opening, a brake control actuator 63 that controls a brake operation, and a seat belt control actuator 64 that controls a seat belt winding mechanism.

The control ECU 4 includes therein a support processor 41, a support operation changer 42, and a trouble determination timing setting unit 43. The support processor 41 determines a situation based on various kinds of information, and executes a support processing.

Specifically, the support processor 41 executes supports such as a lane keeping support, an inter-vehicle distance adjusting support, a collision avoidance support, a collision alleviation support, and a parking support. The lane keeping support is a support processing of preventing the own vehicle from deviating from a traffic lane, by identifying a white line on the road based on an image recognition, notifying the driver about a risk of a vehicle deviating from a traffic lane using the information providing system 5, and controlling the operation using the operation control system 6 (particularly, the steering wheel control actuator 61).

The inter-vehicle distance adjusting support is a support processing of adjusting a distance between vehicles, by measuring a distance between the own vehicle and a vehicle in the front based on image processing or an output from the laser radar 32, notifying the driver about a proper inter-vehicle distance range using the information providing system 5, and controlling the operation using the operation control system 6 (particularly, the throttle control actuator 62).

The collision avoidance support is a support processing of avoiding collision, by detecting a risk of a collision based on image processing or an output from the laser radar 32 or the supersonic sensor 33, and notifying the driver about this risk or executing the avoidance operation (i.e., automatic operation of the brake control actuator 63).

The collision alleviation support is a support processing of alleviating shock of an accident, by predicting the occurrence of a collision based on image processing or an output from the laser radar 32 or the supersonic sensor 33, decreasing the vehicle speed by the brake control actuator 63, winding the seat belt in advance by the seat belt control actuator 64, and triggers an airbag in advance.

The parking support is a support processing of facilitating parking, by determining a state of a parking space based on image processing or an output from the supersonic sensor 33, notifying the driver about this state using the information providing system 5, and controlling the operation using the operation control system 6 (particularly, the steering wheel control actuator 61).

The support operation changer 42 changes the contents of the support processing operation by the support processor 41 when the image processing ECU 3 notifies the occurrence of a trouble in the camera 31. Specifically, the support operation changer 42 notifies that, regarding the notification based on various support processing (i.e., information provision support using the information providing system 5), it is impossible to provide information using image processing because of a trouble in the camera 31.

On the other hand, regarding the operation control of various support processing, the support itself by the operation control is stopped. When substitution of image processing is possible by another sensor (for example, the radar sensor 32 or the supersonic sensor 33), the operation control is switched to a control using this alternative function.

The trouble determination timing setting unit 43 sets trouble determination timing based on a state of the own vehicle, a surrounding state of the own vehicle, and usage of the image information, and transmits the set timing to the image processing ECU 3.

The state of the own vehicle can be obtained from a sensor such as the vehicle speed sensor 34, and the operation control system 6. The surrounding state of the own vehicle can be determined based on the output from the laser radar 32, the supersonic sensor 33, and the image processing ECU 3. The usage of image information changes depending on the support processing provided and the actuator used.

When it is necessary to detect an abnormality of the camera 31 at an early stage, the trouble determination timing setting unit 43 advances the trouble determination timing, that is, the insertion timing of a maximum exposure and a minimum exposure, and sets the insertion interval (i.e., the interval of making a trouble determination) short. On the other hand, when the necessity of detecting an abnormality of the camera 31 at an early stage is low, the trouble determination timing setting unit 43 delays the trouble determination timing, and sets the interval of making a trouble determination long.

For example, when carrying out the information provision processing, the trouble determination timing is delayed and the determination interval is set long, because the necessity of detecting an abnormality of the camera 31 at an early stage is relatively low. On the other hand, when urgent operation control support is necessary such as the collision avoidance support and the collision alleviation support, an abnormality of the camera 31 needs to be detected early in order to quickly and accurately execute the support. Therefore, the trouble determination timing is set fast, and the determination interval is set short.

Figure 12:
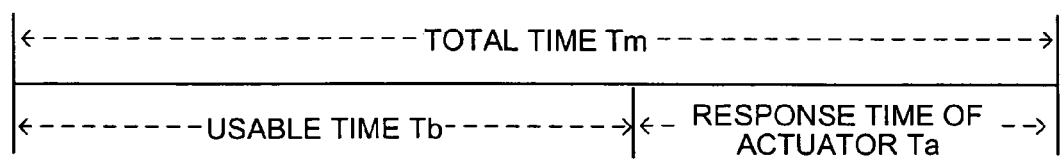
FIG. 12 is an explanatory diagram for explaining setting of a trouble determination timing.

When an image is used to control the operation as described above, the response time of the actuator that is used for this operation control exerts a large influence. For example, suppose that the occurrence of a collision is predicted in the collision alleviation support, and the seat belt control actuator 64 winds up the seat belt in advance. In this case, when a total time from the current time till a predicted time of collision is Tm, the operation of the actuator (i.e., the seat belt control actuator 64) needs to be completed by the predicted time of collision, as shown in FIG. 12.

When the response time of the actuator is "Ta", the time available for the image processing and the trouble determination of the camera 31 is "Tb=Tm−Ta". The trouble determination timing setting unit 43 sets the timing and the interval of the trouble determination so that the time available for detecting an abnormality of the camera 31 is within "Tb".

Since the response speed Ta of the actuator is different for each actuator, the trouble determination timing setting unit 43 sets the timing and the interval of the trouble determination according to the type of the actuator to be used.

The total time "Tm", that is the time available till the operation control ends, changes depending on the state of the own vehicle and the surrounding state. For example, in the inter-vehicle distance adjusting support, the total time "Tm" becomes shorter when the distance between the own vehicle and the vehicle in the front is short. Since the response speed of the actuator used for the inter-vehicle distance adjusting support does not change, the available time "Tb" becomes short, and therefore, the trouble determination timing needs to be set fast and the determination interval needs to be set short.

Similarly, the total time "Tm" becomes shorter when the running speed of the own vehicle measured by the vehicle speed sensor 34 is faster. Therefore, the available time "Tb" becomes short, and consequently, the trouble determination timing needs to be set fast and the determination interval needs to be set short.

As described above, the image processing device (i.e., the image processing ECU), the operation supporting device (i.e., the operation supporting ECU), and the operation supporting system according to the second embodiment change the timing and the interval of switching to a maximum exposure or a minimum exposure by adapting to the surrounding state of the vehicle and the usage of the image information, thereby executing the trouble determination of the camera.

With the above arrangement, a reliable operation supporting system that can securely prevent the occurrence of a malfunction and can stably operate even when a trouble occurs in the camera is obtained.

The operation supporting system according to the second embodiment is an exemplary application of the present invention, and can be implemented by suitably changing the configuration. For example, according to the second embodiment, the control ECU 4 as the operation supporting device has the trouble determination timing setting unit that sets the trouble determination timing by determining the vehicle state, the surrounding state, and the usage of the image information. Alternatively, the image processing ECU 3 can have the trouble determination timing setting unit, or the image processing ECU 3 and the control ECU 4 can be formed integrally.

According to the present invention, whether an imaging unit is abnormal or an imaging environment is unsuitable can be determined without stopping picking up of images. Therefore, there is an effect that a determination can be made whether a camera can pick up a processable image when the environment becomes suitable for imaging even when the picked-up image cannot be processed, or the camera cannot pick up a processable image even when the environment becomes suitable for imaging because the camera has trouble.

According to a second aspect of the invention, a maximum exposure image and a minimum exposure image can be picked up at the same time interval as that of the imaging during an exposure automatic control period. Therefore, there is an effect that an image processing device that can determine whether the imaging unit is abnormal or the environment is not suitable for imaging, at the same time interval as that of picking up normal images during the exposure automatic control period is obtained.

According to a third aspect of the invention, the imaging during the exposure automatic control period is longer than the imaging during a maximum exposure period and a minimum exposure period. Therefore, there is an effect that the number of images obtained by the imaging during the exposure automatic control period is larger than that obtained by the imaging in a maximum exposure and a minimum exposure at the same time interval as that of the imaging during the exposure automatic control period.

According to a fourth aspect of the invention, whether the exposure of a picked-up image is unsuitable can be determined easily by determining whether a smear or a ghost occurs in the image picked up during a minimum exposure period. When the exposure during the exposure automatic control period is controlled to a proper value, an image without a smear or a ghost during the exposure automatic control period can be picked up. Therefore, there is an effect that an image processing device that can determine to continue to pick up images without waiting for a change of the imaging environment is obtained.

According to a fifth aspect of the invention, there is an effect that an image processing device that can easily determine whether the imaging unit is abnormal or the environment is not suitable for imaging, by only recognizing that the image picked up during a maximum exposure period has a dark density loss and the image picked up during a maximum exposure period has a bright density loss is obtained.

According to a sixth aspect of the invention, an abnormality of the imaging unit can be determined by picking up an image twice during a maximum exposure period. Therefore, there is an effect that an image processing device that can determine an abnormality of the imaging unit in a short time is obtained.

According to a seventh aspect of the invention, an abnormality of the imaging unit can be determined by only picking up an image of a predetermined light source. Therefore, there is an effect that an image processing device that can determine an abnormality of the imaging unit with a simple configuration is obtained.

According to an eighth aspect of the invention, an abnormality of the imaging unit can be determined by only picking up an image twice during a minimum exposure period. Therefore, there is an effect that an image processing device that can determine an abnormality of the imaging unit in a short time is obtained.

According to a ninth aspect of the invention, an abnormality of the imaging unit can be determined by only picking up an image by cutting a light source. Therefore, there is an effect that an image processing device that can determine an abnormality of the imaging unit with a simple configuration is obtained.

According to a tenth aspect of the invention, density of an image obtained by one-time scanning is recognized among images picked up based on the interlace system. Therefore, there is an effect that an image processing device that can shorten the time required to recognize the density of an image is obtained.

According to an eleventh aspect of the invention, when imaging is based on the interlace system, a dark density loss is determined using an image obtained at the first scanning, and an abnormality of the imaging unit or an unsuitable imaging environment is determined using an image obtained at the second scanning. Therefore, there is an effect that an image processing device that can shorten the time required to determine a dark density loss, an abnormality of the imaging unit, or an unsuitable imaging environment is obtained.

According to a twelfth aspect of the invention, when imaging is based on the interlace system, a bright density loss is determined using an image obtained at the first scanning, and an abnormality of the imaging unit or an unsuitable imaging environment is determined using an image obtained at the second scanning. Therefore, there is an effect that an image processing device that can shorten the time required to determine a bright density loss, an abnormality of the imaging unit, or an unsuitable imaging environment is obtained.

According to a thirteenth aspect of the invention, a user of the image processing device can confirm an abnormality of the imaging unit when the imaging unit is abnormal. Therefore, there is an effect that an image processing device that can quickly respond to an abnormality of the imaging unit is obtained.

According to a fourteenth aspect of the invention, when controlling the exposure based on the density distribution of an image, the image processing device inserts a maximum exposure period for compulsively setting a maximum exposure and a minimum exposure period for compulsively setting a minimum exposure. The image processing device determines whether the imaging unit is abnormal or the environment is unsuitable for imaging or both, based on an image picked up during the maximum exposure period or the minimum exposure period. Therefore, there is an effect that an image processing device that can quickly detect an abnormality of the imaging unit is obtained.

According to a fifteenth aspect of the invention, when the image processing device determines a state of the imaging unit based on an image picked up during the maximum exposure period or the minimum exposure period, the image processing device variably controls the insertion timing and the insertion interval of the maximum exposure period and the minimum exposure period. Therefore, there is an effect that an image processing device that can detect an abnormality of the imaging unit at an optional timing and at an optional interval is obtained.

According to a sixteenth aspect of the invention, when the image processing device determines a state of the imaging unit based on an image picked up during the maximum exposure period or the minimum exposure period, the image processing device variably controls the insertion timing and the insertion interval of the maximum exposure period and the minimum exposure period corresponding to a state of the own vehicle, a surrounding state of the own vehicle, and a usage of the picked-up image. Therefore, there is an effect that an image processing device that can detect an abnormality of the imaging unit at a timing and at an interval suitable for the situation is obtained.

According to a seventeenth aspect of the invention, when controlling the exposure based on the density distribution of an image, the image processing device inserts a maximum exposure period for compulsively setting a maximum exposure and a minimum exposure period for compulsively setting a minimum exposure. The image processing device determines whether the imaging unit is abnormal or the environment is unsuitable for imaging or both, based on an image picked up during the maximum exposure period or the minimum exposure period, and outputs a result of the determination to an external vehicle controlling device. Therefore, there is an effect that an image processing device that can quickly detect an abnormality of the imaging unit and can notify the result of the detection to another unit is obtained.

According to an eighteenth aspect of the invention, the operation supporting device controls the operation of the vehicle using the image information obtained from the processing by the image processing device or provides information to the driver, thereby supporting the running of the vehicle. When an abnormality occurs in the imaging unit of the image processing device, the operation supporting device changes the contents of the support operation. Therefore, there is an effect that an operation supporting device that can securely prevent a malfunction even when an abnormality occurs in the imaging unit is obtained.

According to a nineteenth aspect of the invention, the operation supporting device sets the insertion timing and the insertion interval of a maximum exposure period or a minimum exposure period based on a state of the own vehicle, a surrounding state of the own vehicle, and a usage of the image information, and transmits the set information to the image processing device that determines an abnormality of the imaging unit using an image picked up by inserting the maximum exposure period and the minimum exposure period into the exposure automatic control period based on a density distribution of the image. Therefore, there is an effect that an operation supporting device that can make the image processing device detect an abnormality of the imaging unit at a necessary timing and at a necessary interval is obtained.

According to a twentieth aspect of the invention, the operation supporting device sets the insertion timing and the insertion interval of a maximum exposure period and a minimum exposure period based on a distance between the own vehicle and the other vehicle, a running speed of the own vehicle, and a response speed of an actuator used to control the operation of vehicle, and transmits the set information to the image processing device that determines an abnormality of the imaging unit using an image picked up by inserting the maximum exposure period or the minimum exposure period into the exposure automatic control period based on a density distribution of the image. Therefore, there is an effect that an operation supporting device that can make the image processing device detect an abnormality of the imaging unit at a necessary timing and at a necessary interval is obtained.

According to a twenty-first aspect of the invention, the operation supporting device carries out a lane keeping support, an inter-vehicle distance adjusting support, a collision avoidance support, a collision alleviation support, and a vehicle parking support, using the image information obtained from the processing by the image processing device. When an abnormality occurs in the imaging unit used by the image processing device, the operation supporting device changes the contents of the support operation. Therefore, there is an effect that an operation supporting device that can securely prevent a malfunction even when an abnormality occurs in the imaging unit is obtained.

According to a twenty-second aspect of the invention, the operation supporting device controls the operation of the vehicle using the image information obtained from the processing by the image processing device or provides information to the driver, thereby supporting the running of the vehicle. When an abnormality occurs in the imaging unit used by the image processing device, the operation supporting device stops the support operation. Therefore, there is an effect that an operation supporting device that can securely stop the support operation when an abnormality occurs in the imaging unit is obtained.

According to a twenty-third aspect of the invention, the operation supporting device controls the operation of the vehicle using the image information obtained from the processing by the image processing device or provides information to the driver, thereby supporting the running of the vehicle. When an abnormality occurs in the imaging unit used by the image processing device, the operation supporting device carries out the support operation using another detector as an alternative unit. Therefore, there is an effect that an operation supporting device that can continue the support operation using the alternative unit even when an abnormality occurs in the imaging unit is obtained.

According to a twenty-fourth aspect of the invention, when controlling the exposure based on the density distribution of an image, the operation supporting system inserts a maximum exposure period for compulsively setting a maximum exposure and a minimum exposure period for compulsively setting a minimum exposure. The operation supporting system determines whether the imaging unit is abnormal or the environment is unsuitable for imaging or both, based on an image picked up during the maximum exposure period or the minimum exposure period, and supports the running of the vehicle using the image. Therefore, there is an effect that an operation supporting system that can quickly detect an abnormality of the imaging unit is obtained.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing device comprising:
   an imaging unit that picks up an image;
   an image density recognizer that recognizes density of the image; and
   an exposure controller that in an exposure control period automatically controls an exposure of the imaging unit based on the density recognized, wherein the exposure control period includes at least a maximum exposure period during which the exposure is set to a maximum exposure, a minimum exposure period during which the exposure is set to a minimum exposure, and a normal exposure period during which the exposure is set to in between the maximum exposure and the minimum exposure; and
   a problem recognizer that determines any one of whether the imaging unit is abnormal and whether an environment is unsuitable for picking up an image by the imaging unit based on densities of images, which are recognized by the image density recognizer, that are picked up during the maximum exposure period, the minimum exposure period, and/or the normal exposure period, wherein
   the maximum exposure period, the minimum exposure period, and the normal exposure period have substantially same time length and appear in a predetermined order in the exposure control period.

2. The image processing device according to claim 1, wherein
   the normal exposure period is longer than the maximum exposure period and the minimum exposure period.

3. The image processing device according to claim 1, wherein the problem recognizer determines that the exposure during the normal exposure period is unsuitable when
   densities of the image, which is recognized by the image density recognizer, that is picked up during the normal exposure period show a smear or a ghost as a false signal occurs and when the densities of the image, which is recognized by the image density recognizer, that is picked up during the minimum exposure period do not show a smear or a ghost.

4. The image processing device according to claim 1, wherein the problem recognizer determines any one of that the imaging unit is abnormal and the environment is unsuitable for picking up an image by the imaging unit when an image picked up during the maximum exposure period has a dark density loss or when an image picked up during the minimum exposure period has a bright density loss.

5. The image processing device according to claim 1, wherein
   when an image picked up during the maximum exposure period has a dark density loss, the problem recognizer determines, after changing the imaging environment such that an image picked up at the maximum exposure does not have a dark density loss, that
   the imaging unit is abnormal when, an image picked up during the maximum exposure period has a dark density loss, and
   the environment is unsuitable for picking up an image by the imaging unit when the image does not have a dark density loss.

6. The image processing device according to claim 1, wherein
   an imaging environment in which an image picked up during the maximum exposure period does not have a dark density loss is an imaging environment in which the imaging unit picks up a predetermined image of a light source.

7. The image processing device according to claim 1, wherein
   when an image picked up during the minimum exposure period has a bright density loss, the image recognizer determines, after changing the imaging environment such that an image picked up at the minimum exposure does not have a bright density loss, that
   the imaging unit is abnormal when an image picked up during the maximum exposure period has a bright density loss, and
   the environment is unsuitable for picking up an image by the imaging unit when the image does not have a bright density loss.

8. The image processing device according to claim 1, wherein
   an imaging environment in which an image picked up during the minimum exposure period does not have a bright density loss is an imaging environment in which the imaging unit picks up an image by cutting a light source.

9. The image processing device according to claim 1, wherein the imaging unit picks up an image according to an interlace system of scanning twice including an odd-line scan and an even-line scan,
   wherein the image density recognizer recognizes density using an image obtained by scanning one time.

10. The image processing device according to claim 9, wherein the problem recognizer determines whether a dark density loss occurs based on an image obtained at a first scanning, and determines whether the imaging unit is abnormal or the imaging environment is unsuitable based on an image obtained at a second scanning.

11. The image processing device according to claim 9, wherein the problem recognizer determines whether a bright density loss occurs based on an image obtained at a first scanning, and determines whether the imaging unit is abnormal or the imaging environment is unsuitable based on an image obtained at a second scanning.

12. The image processing device according to claim 1, further comprising an alarm unit that notifies an abnormality of the imaging unit when the problem recognizer determines that the imaging unit is abnormal.

13. An image processing device comprising:
an image obtaining unit that includes any one of an imaging unit that picks up an image of a surrounding of a vehicle and from an external device receives an image of a surrounding of a vehicle picked up by an imaging unit;
an exposure controller that during an exposure control period automatically controls an exposure of the imaging unit based on a density distribution of an image obtained by the image obtaining unit, wherein the exposure automatic control period includes at least a maximum exposure period during which the exposure is set to a maximum exposure, a minimum exposure period during which the exposure is set to a minimum exposure, and a normal exposure period during which the exposure is set to in between the maximum exposure and the minimum exposure;
a determining unit that determines at least one of whether the imaging unit is abnormal and whether an environment is unsuitable for picking up an image by the imaging unit, based on densities of images that are picked up during the maximum exposure period, the minimum exposure period, and the normal exposure period; and
an output unit that outputs a result of determination made by the determining unit to an external vehicle-controlling device.

14. The image processing device according to claim 13, further comprising a timing changer that changes lengths and/or positions in the exposure automatic control period of the maximum exposure period, the minimum exposure period, and/or the normal exposure period.

15. The image processing device according to claim 14, wherein the imaging unit is fixed to a vehicle, and
the image processing device further comprising a timing setting unit that controls the timing changer so as to set the lengths and/or the positions based on at least one of a state of the vehicle, conditions around the vehicle, and usage of a picked-up image.

16. A method of processing an image, comprising:
picking up an image;
recognizing a density of the image; and
controlling automatically an exposure in an exposure control period at the picking up based on the density recognized, wherein the exposure control period includes at least a maximum exposure period during which the exposure is set to a maximum exposure, a minimum exposure period during which the exposure is set to a minimum exposure, and a normal exposure period during which the exposure is set to in between the maximum exposure and the minimum exposure; and
determining any one of whether the picking up is abnormal and whether an environment is unsuitable for the picking up based on densities of images recognized that are picked up during the maximum exposure period, the minimum exposure period, and/or the normal exposure period, wherein
the maximum exposure period, the minimum exposure period, and the normal exposure period have substantially same time length and appear in a predetermined order in the exposure control period.

17. A method of processing an image, comprising:
picking up an image of a surrounding of a vehicle;
receiving an image of a surrounding of a vehicle from an external device;
controlling automatically an exposure in an exposure control period at the picking up based on density distributions of the image picked up and the image received from the external device, wherein the exposure automatic control period includes at least a maximum exposure period during which the exposure is set to a maximum exposure, a minimum exposure period during which the exposure is set to a minimum exposure, and a normal exposure period during which the exposure is set to a minimum exposure and a normal exposure period during which the exposure is set to in between the maximum exposure and the minimum exposure;
determining at least one of whether the picking up is abnormal and whether an environment is unsuitable for the picking up, based on densities of images that are picked up during the maximum exposure period, the minimum exposure period, and the normal exposure period; and
outputting a result of the determining to an external vehicle-controlling device.

* * * * *